United States Patent [19]

Shibata et al.

[11] Patent Number: 4,513,337

[45] Date of Patent: Apr. 23, 1985

[54] MAGNETIC HEAD FOR PERPENDICULAR MAGNETIZATION RECORDING

[75] Inventors: Shin Shibata; Akira Aoyama; Tetsuya Mino, all of Suwa, Japan

[73] Assignee: Kabushiki Kaisha Suwa Seikosha, Japan

[21] Appl. No.: 602,621

[22] Filed: Feb. 27, 1984

Related U.S. Application Data

[63] Continuation of Ser. No. 294,086, Aug. 19, 1981, abandoned.

[30] Foreign Application Priority Data

Aug. 20, 1980 [JP] Japan .................. 55-114171

[51] Int. Cl.³ .................. G11B 5/27; G11B 5/22
[52] U.S. Cl. .................. 360/121; 360/122; 360/125
[58] Field of Search .............. 360/125, 110, 119, 121, 360/122

[56] References Cited

U.S. PATENT DOCUMENTS

| | | | |
|---|---|---|---|
| 2,846,517 | 8/1958 | Farrand | 360/125 |
| 4,253,127 | 2/1981 | Kodama et al. | 360/125 |
| 4,383,284 | 5/1983 | Isshiri | 360/125 |
| 4,413,297 | 11/1983 | Tanaka et al. | 360/119 |

FOREIGN PATENT DOCUMENTS

| | | | |
|---|---|---|---|
| 52-55513 | 5/1977 | Japan | 360/119 |
| 53-9110 | 1/1978 | Japan | 360/125 |
| 54-34205 | 3/1979 | Japan | 360/119 |
| 54-119220 | 9/1979 | Japan | 360/125 |
| 56-11612 | 5/1981 | Japan | 360/122 |
| 56-74809 | 6/1981 | Japan | 360/125 |
| 57-133511 | 8/1982 | Japan | 360/110 |
| 57-164412 | 10/1982 | Japan | 360/125 |
| 57-164415 | 10/1982 | Japan | 360/125 |
| 57-172525 | 10/1982 | Japan | 360/125 |
| 57-179924 | 11/1982 | Japan | 360/122 |
| 532886 | 1/1977 | U.S.S.R. | 360/119 |

OTHER PUBLICATIONS

*IBM Technical Disclosure Bulletin,* vol. 20, No. 8, Jul. '78, pp. 3311-3312, Combined Longitudinal and Vertical Magnetic Recording Head, A. Hoagland.

*Primary Examiner*—George G. Stellar
*Attorney, Agent, or Firm*—Blum Kaplan Friedman Silberman & Beran

[57] ABSTRACT

A magnetic head for perpendicular magnetization recording especially suitable for operation from only one side of a magnetic tape includes a central magnetic pole surrounded in spaced relationship by a peripheral magnetic pole. An exciting coil is wound around the central magnetic pole for maintaining the central and peripheral magnetic pole at different magnetic potentials. Both magnetic poles are located on the same side of a multilayer magnetic recording medium to be magnetized by the recording head.

10 Claims, 11 Drawing Figures

MAGNETIC HEAD FOR PERPENDICULAR MAGNETIZATION RECORDING

This is a continuation of application Ser. No. 294,086 filed Aug. 19, 1981 now abandoned.

BACKGROUND OF THE INVENTION

This invention relates generally to a magnetic head for perpendicular magnetization recording, and more particularly to a magnetic head for perpendicular magnetization recording where the head mechanism is entirely on one side of the tape for recording thereon. Perpendicular magnetization has recently been proposed in order to achieve high recording density on a magnetic recording tape. A system utilizing the principles of perpendicular magnetization includes a magnetic head comprising a slender main magnetic pole and an auxiliary magnetic pole disposed in an opposed relationship to the main magnetic pole with a magnetic recording tape arranged to travel between the two magnetic poles. The main magnetic pole is energized to apply a concentrated magnetic field to the tape for recording information on the tape. Such an early developmental system has disadvantages in that the magnetic head is mechanically complex in structure and is not readily applicable to an ordinary cassette tape unless the tape is pulled out of the cassette housing and positioned in the magnetic head before the recording or playback process is initiated.

Further information on a magnetic head for perpendicular magnetization recording can be found in the Japanese Laid-Open Patent Publication Nos. 52-134706, 53-32009, 54-51804, and 54-51810 by Shunichi Iwasaki. Also, an article in the January 1980 edition of *Science*, published by Nippon Keizai Shinbunsha, Japan, pages 50–60, discusses perpendicular magnetization recording.

What is needed is a magnetic head for perpendicular magnetization recording which is suitable for recording and playback of magnetic tapes and operates from only one side of the tape.

SUMMARY OF THE INVENTION

Generally speaking, in accordance with the invention, a magnetic head for perpendicular magnetization recording especially suitable for operation from only one side of a magnetic tape is provided. The magnetic head for perpendicular magnetization recording includes a central magnetic pole surrounded in spaced relationship by a peripheral magnetic pole. An exciting coil is wound around the central magnetic pole for maintaining the central and peripheral magnetic pole at different magnetic potentials. Both magnetic poles are located on the same side of a multi-layer magnetic recording medium to be magnetized by the recording head.

Further, the central magnetic head may be sandwiched in spaced relation between a pair of parallel peripheral magnetic poles which have exciting coils wound there around. In an alternative embodiment of a magnetic head for perpendicular magnetization recording, a thin magnetic pole and a thick magnetic pole connected together by a connecting portion around which the exciting coil is wound. In every construction, the head operates from only one side of the recording tape and construction is simple.

Accordingly, it is an object of this invention to provide an improved magnetic recording head which is positioned on one side of a multi-layer recording medium for perpendicular magnetization thereof.

Another object of this invention is to provide an improved magnetic head for perpendicular magnetization recording which is simple in construction.

Still other objects and advantages of this invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which.

DESCRIPTION OF THE PREFERRED EMBODIMENTS

Figure 1:
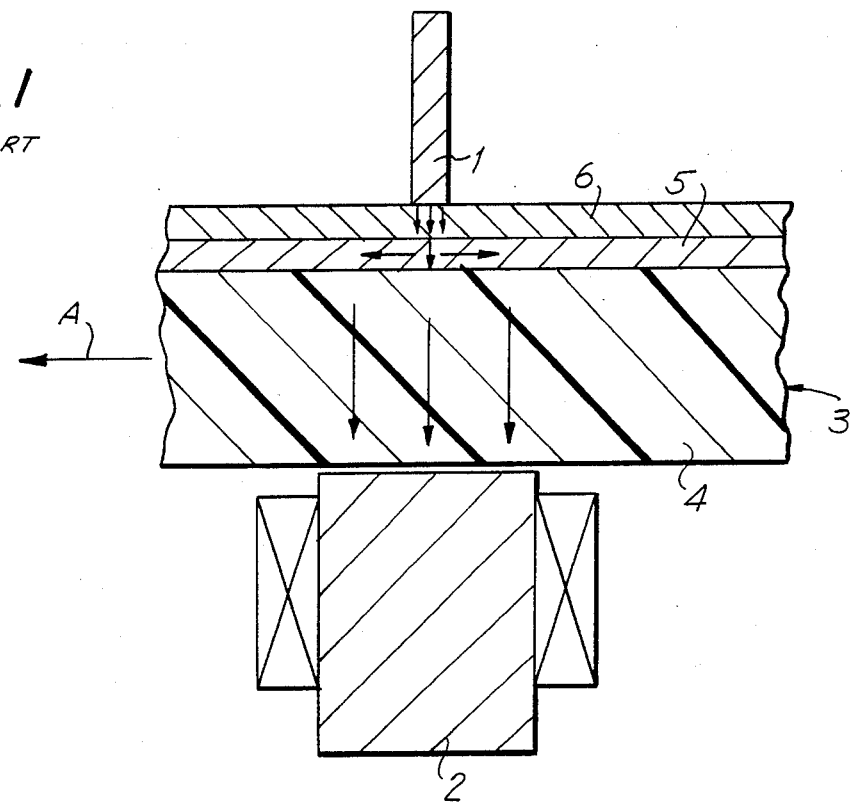
FIG. 1 is a cross sectional view of a magnetic head for perpendicular magnetization recording of the prior art.

With reference to FIG. 1, a conventional system for perpendicular magnetization recording which has been proposed includes a main magnetic pole 1 of a reduced width and an auxiliary magnetic pole 2 spaced from the main magnetic pole 1 in a confronting or opposing relationship. The width of the auxiliary magnetic pole 2 is substantially larger than the width of the main magnetic pole 1.

A multi-layer recording medium 3, that is, a recording tape, is movable by means (not shown) between the magnetic poles 1,2 in the direction indicated by the arrow A. The multi-layer recording medium 3 includes a base 4, a film 5, for example, Permalloy having a high permeability and an easy axis of magnetization in the horizontal direction. The recording medium 3 also includes a magnetic recording film 6 of a sputtered alloy of cobalt and chromium which has an easy axis of magnetization in the perpendicular direction. This magnetic head for perpendicular magnetization recording as shown in FIG. 1 presents the problems and difficulties discussed in the background description, namely, the recording medium 3 passes between the two poles 1,2 making the construction and usage complicated.

Figure 2:
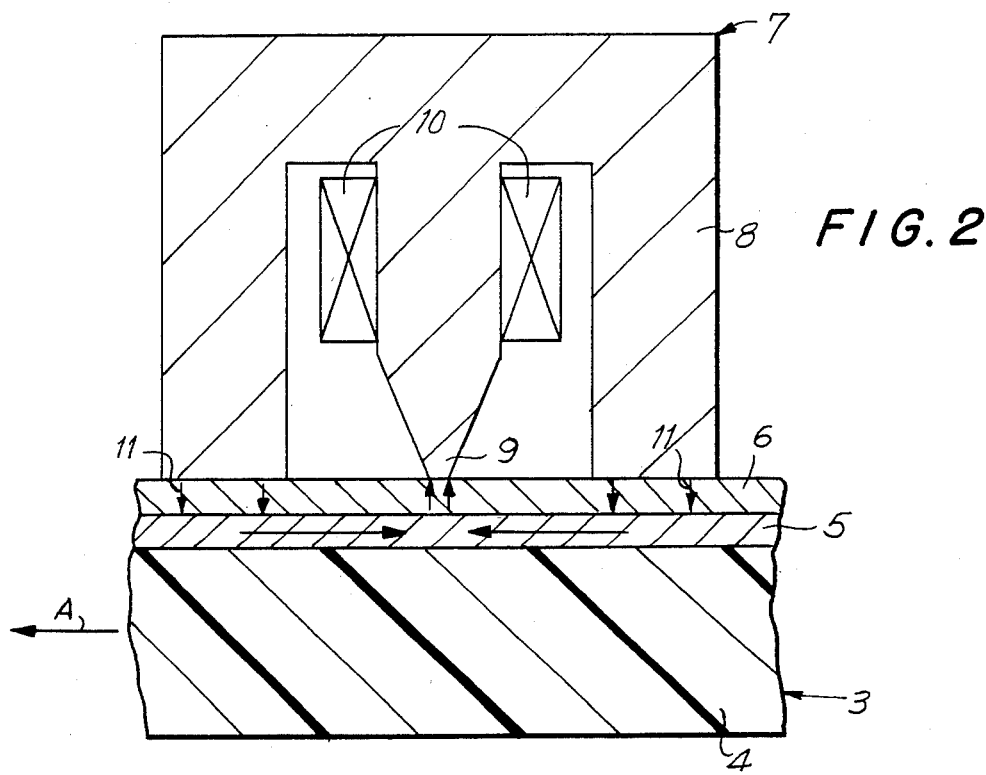
FIG. 2 is a cross sectional view of a magnetic head for perpendicular magnetization recording in accordance with this invention.

With reference to FIG. 2, a magnetic head for perpendicular magnetization recording head 7, in accordance with the present invention, is constructed as a pot core and includes a peripheral magnetic pole 8 and a central magnetic pole 9. An exciting coil 10 is positioned around the central magnetic pole 9 for producing a magnetic flux field which runs from the peripheral magnetic pole 8 to the central magnetic pole 9 through a recording medium 3 as indicated by the arrows. The recording medium 3 moves past the magnetic head 7 for perpendicular magnetization recording, in accordance with this invention, in the direction indicated by the arrow A.

Because the magnetic recording film 6 on the recording medium 3 has a easy perpendicular axis of magnetization, the magnetic flux passes in the directions shown by the arrows 11 through the film 6 and few magnetic lines of flux run horizontally of the recording medium 3 in the film 6. The peripheral magnetic pole 8 has a wide area for contact with the recording medium 3 such that the magnetic field produced does not exceed the magnetic coercive force of the film 6. As a result, no residual magnetism is created in the film 6 by the peripheral magnetic pole 8.

However, the central magnetic pole 9 has a greatly reduced area for contacting the recording film 6. Thus, an intensive magnetic field is generated at that point of the magnetic circuit which causes the recording film 6 to have a residual magnetism after the recording medium 3 has passed the head 7. Whereas the magnetic head 7 in its entirety is relatively large in size, only the small area at the tip of the central magnetic pole 9, in contact with the recording medium 3, produces magnetic recordings on the recording medium 3. Therefore, the magnetic head 7, in accordance with this invention, provides a magnetic recording density as high as the earlier system for perpendicular magnetization recording while at the same time being located on only one side of the recording medium 3.

The magnetic head 7 of FIG. 2 is now described in more detail from a theoretical viewpoint.

It is assumed that the recording film 6 has a thickness $d_1$, a perpendicular permeability $\mu_1$, and a horizontal permeability $\mu_2$. The Permalloy film 5 has a thickness $d_2$, a perpendicular permeability $\mu_3$, and a horizontal permeability $\mu_4$. The central magnetic pole 9 has a radius $r_1$ at its portion for contact with the recording film 6. The peripheral magnetic pole 8 has an inside diameter $r_2$ and an outside diameter $r_3$, and the recording film 6 has a magnetic coercive force Hc. The magnetic field H in the recording film 6 just opposite the central magnetic pole 9 can be given by the following equation:

$$H = \phi/\mu_1 \cdot 2\pi r_1$$

Assume:
$r_1 = 1 \times 10^{-6}$ (m)
$\mu_1 = 5\mu_o = 5 \times 4\pi \times 10^{-7}$ (H/m) where $\mu_o$ is the space permeability
$\phi = 9.3 \times 10^{31\ 7}$ (Wb) when the magnetic field H is equal to the magnetic coercive force Hc ($=300/4\pi \cdot 10^{-3}$ AT/m).

The magnetic field H' in the recording film 6 just opposite the peripheral magnetic pole 8 can be expressed by the following equation:

$$H' = \phi/\mu_1 \cdot 2\pi(r_3 - r_2)$$

Assuming that $\phi = 9.3 \times 10^{-7}$ (Wb); $r_2 = 5 \times 10^{-6}$ (m), and $r_3 = 10 \times 10^{-6}$ (m), then $H' = 7.6 \times 10^{-4}$ (AT/Wb) = 60 oersted.

Whereas the magnetic field of 300 oersted equal to Hc is generated just opposite the central magnetic pole 9, the magnetic field generated opposite the peripheral magnetic pole 8 has an intensity of only 60 oersted. Sixty oersted is far below the magnetic coercive force required of the recording films 6 and hence, the field at the peripheral magnetic pole 8 cannot magnetize the recording film 6. With this construction of a magnetic circuit, magnetization takes place in the recording film 6 only at the location just opposite the central magnetic pole 9 but not opposite the peripheral magnetic pole 8.

In order for the magnetic flux lines to run in the directions of the arrows shown in FIG. 2, the following requirements need be met:

$$\mu_1 >> \mu_2 \qquad (1)$$

$$\mu_1 >> \mu_o$$

$$\mu_3 >> \mu_1 \qquad (2)$$

The requirements of (1) are met by selecting the conditions in which the recording film 6 is fabricated. The requirement (2) is met by using permalloy for the film.

The magnetic head 7 constructed in accordance with the present invention enables magnetic recording by way of perpendicular magnetization with a one-sided head, that is, operating from one side of the tape. This is an advantage over the earlier magnetic head illustrated in FIG. 1.

Figure 3A:
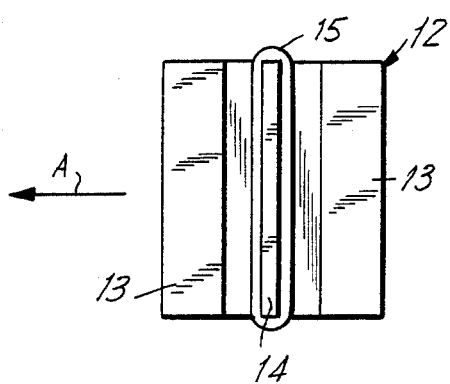
FIGS. 3a, 3b and 3c are bottom, side elevational and end views respectively of another embodiment of a magnetic head for perpendicular magnetization recording in accordance with this invention.
Figure 3B:
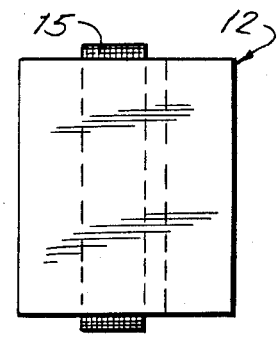
Figure 3C:
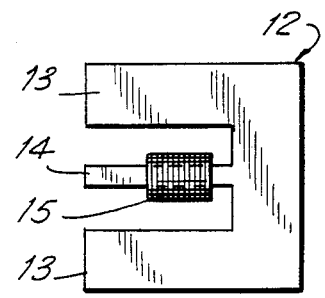

FIGS. 3a,b,c show an alternative embodiment of a magnetic head for perpendicular magnetization recording in accordance with this invention. A magnetic head 12 comprises a pair of parallel peripheral magnetic poles 13 disposed in an equi-spaced relationship to a central magnetic pole 14. That is, the pole 14 is sandwiched between the peripheral magnetic poles 13. An exciting coil 15 is wound around the central magnetic pole 14. The width, in the direction A of motion of the recording medium, of the central pole 14 is far less than the combined widths of the peripheral magnetic poles 13. Thus, the principles of performance are the same in the construction of FIGS. 3a,b,c as in the head of FIG. 2, however, there are practical advantages of construction which favor the head of FIG. 3.

Figure 4A:
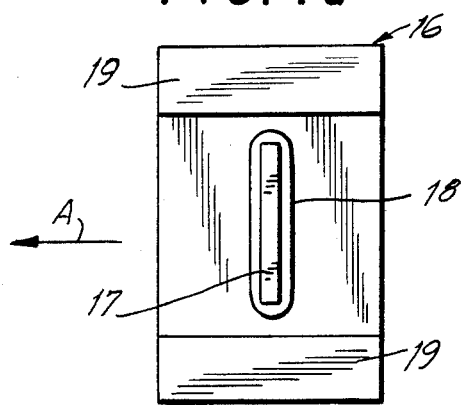
FIGS. 4a and 4b are bottom and side elevational views of an alternative embodiment of a magnetic head for perpendicular magnetization recording in accordance with this invention.
Figure 4B:
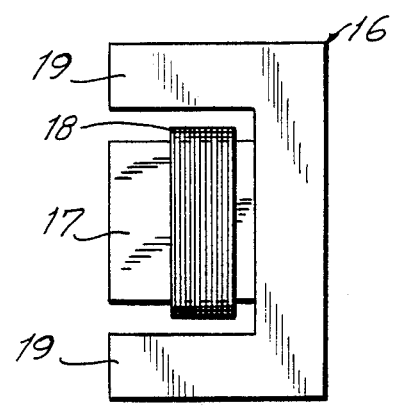

Another alternative embodiment of a magnetic head for perpendicular magnetization recording in accordance with this invention is shown in FIGS. 4a and 4b. A magnetic head 16 includes a central magnetic pole 17 positioned substantially transversely between a pair of pheripheral magnetic poles 19. The central magnetic pole 17 is shorter than in the embodiment of FIGS. 3a,b,c and is suited for recording along a narrower track of a recording medium moving past the head 17 in the direction indicated by the arrow A.

Figure 5A:
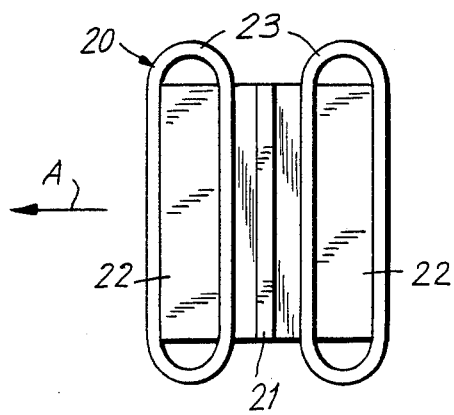
FIGS. 5a and 5b are bottom and side elevational views respectively of another alternative embodiment of a magnetic head for perpendicular magnetization recording in accordance with this invention.
Figure 5B:
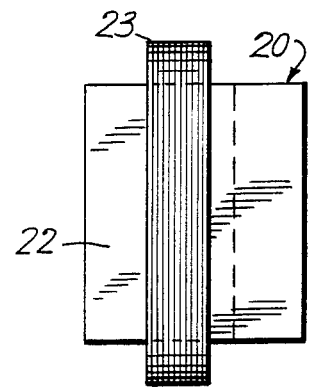

Another alternative embodiment of a magnetic head for perpendicular magnetization recording in accordance with this invention is shown in FIGS. 5a,b, wherein a magnetic head 20 comprises a thin central magnetic pole 21 and a pair of thick peripheral magnetic poles 22 (similar to the head 12 of FIGS. 3a,b,c). The poles 22 are disposed one on each side of the magnetic pole 21 and are each wound with an exciting coil 23. With this arrangement, the central magnetic pole 21 is not easily saturated magnetically. The principles of operation are the same as in the embodiments of FIGS. 2,3,4. In particular, the magnetizing forces produced at the interface of the thick magnetic poles 22 are insufficient to leave a remanent magnetism in a recording medium passing the head in the direction indicated by the arrow A, whereas the pole 21 magnetizes the recording medium.

Figure 6A:
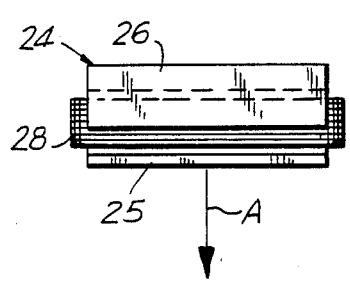
FIGS. 6a and 6b are bottom and side elevational views of yet another alternative embodiment of a magnetic head for perpendicular magnetization recording in accordance with this invention.
Figure 6B:
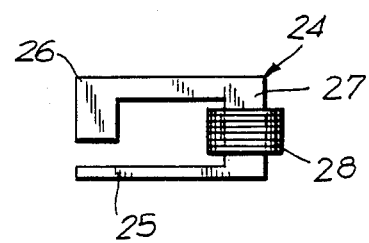

Another alternative embodiment of a magnetic head for perpendicular magnetization recording in accordance with this invention is shown in FIGS. 6a and 6b. A magnetic head 24 comprises a thin magnetic pole 25 and a single thick magnetic pole 26. The thin magnetic pole 25 and the thick magnetic pole 26 are connected to each other by a connecting portion 27 around which an exciting coil 28 is wound. As in the embodiment in accordance with this invention described above, the magnetic fields at the narrow pole 25 are sufficiently strong to leave a remanent magnetism in a recording medium moving past the head in a direction indicated by the arrow A, whereas the magnetic fields adjacent to the single thick magnetic pole 26 are of insufficient strength to leave a remanent magnetism in the recording medium.

The cores of the magnetic heads, described above, should preferably be constructed of ferrite or Permalloy. The core structure 16 shown in FIGS. 4a and 4b may be constructed of parts as such a structure is difficult to form integrally.

With the constructions of a magnetic head for perpendicular magnetization recording in accordance with the present invention, the head is simple to use because it can be located at one side of a multi-layer recording medium. The magnetic head in accordance with this invention can be used for recording information on or reproducing information from the recording medium.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of invention herein described, and all statements of the scope of the invention, as a matter of language, might be said to fall therebetween.

What is claimed is:

1. A recording head for perpendicular magnetization recording of a magnetic recording medium, said medium including a recording film having a direction of travel and an easy axis of magnetization perpendicular to the plane of the magnetic recording medium and a layer of a high permeability backing said recording film, comprising:

a core including a first magnetic pole and two second magnetic poles, said first pole having a shorter width than said second magnetic poles parallel to said direction of travel and in the plane of the medium, said first and second magnetic poles having equal length extending transversely to said direction of travel and parallel to the plane of the medium and being physically spaced apart in the direction of travel of said recording medium relative to said recording head and magnetically coupled together, an exciting coil wound on said core, said first and second poles being dimensioned for keeping said first and second magnetic poles at different magnetic potentials when said coil is excited, said two second magnetic poles being disposed one on each side of said first magnetic pole and spaced apart therefrom in said direction of travel of said recording medium, said first and second magnetic poles being positioned in opposition to the same face surface of said magnetic recording medium recording on said medium, whereby magnetic flux lines induced between said poles and passing through said medium are parallel to said direction of travel.

2. A recording head as claimed in claim 1, wherein said pair of second magnetic poles are equally spaced from said first magnetic pole.

3. A recording head as claimed in claim 1, wherein said first and second poles are parallel to said face surface of said medium.

4. A recording head as claimed in claim 1, wherein said core further includes a connecting portion, said connecting portion joining said first and second magnetic poles, said exciting coil being mounted on said connecting portion.

5. A recording head as claimed in claim 1, wherein said exciting coil is mounted on said first magnetic pole.

6. A recording head as claimed in claim 1, wherein said exciting coil is mounted on one of said magnetic poles.

7. A recording head as claimed in claim 6, and further including another exciting coil, said pair of exciting coils being mounted one on each second magnetic pole.

8. A recording head as claimed in claim 7, wherein said first and second poles are parallel to said face surface of said medium.

9. A recording head as claimed in claim 7, wherein said pair of second magnetic poles are equally spaced from said first magnetic pole.

10. A recording head as claimed in claim 1, 4, 5 or 6, wherein said first and second magnetic poles each include a surface on a common plane, said surfaces being positioned adjacent said recording medium surface for recording on said medium, the area of each of said second magnetic poles at said plane being greater than the area of said first magnetic pole at said plane, whereby said different magnetic potentials are produced at said surface.

* * * * *